United States Patent [19]

Seamans

[11] Patent Number: 5,915,142
[45] Date of Patent: Jun. 22, 1999

[54] CAMERA EXTRACTS FILM CARTRIDGE RESPONSIVE TO OPENING DOOR

[75] Inventor: Tom Seamans, Corfu, N.Y.

[73] Assignee: Eastman Kodak Company, Rochester, N.Y.

[21] Appl. No.: 09/017,750

[22] Filed: Feb. 3, 1998

[51] Int. Cl.⁶ .................................................. G03B 17/24
[52] U.S. Cl. .......................................... 396/536; 396/538
[58] Field of Search .................................... 396/535, 536, 396/538

[56] References Cited

U.S. PATENT DOCUMENTS

| | | |
|---|---|---|
| 3,543,664 | 12/1970 | Kremp et al. . |
| 3,672,279 | 6/1972 | Hackenberg et al. . |
| 4,095,249 | 6/1978 | Miura . |
| 4,330,190 | 5/1982 | Cahn . |
| 4,641,936 | 2/1987 | Harvey et al. . |
| 5,323,201 | 6/1994 | Richiuso et al. . |
| 5,430,515 | 7/1995 | Lawther et al. . |
| 5,432,573 | 7/1995 | Lawther et al. . |
| 5,477,295 | 12/1995 | Lawther et al. . |
| 5,506,650 | 4/1996 | Stephenson et al. . |

Primary Examiner—David M. Gray
Attorney, Agent, or Firm—Roger A. Fields

[57] ABSTRACT

A camera comprising a chamber for receiving a film cartridge, a door supported for closing movement to cover the chamber and for opening movement to uncover the chamber, and an extracting mechanism connected with the door for pulling the film cartridge at least part way out of the chamber when the door is opened, is characterized in that the extracting mechanism includes an engaging member adapted to engage a protruding spool end of the film cartridge, to permit the engaging member to tilt the film cartridge out of the chamber when the door is opened. Preferably, the engaging member has a partially enclosed catch-space configured to receive the protruding spool end of the film cartridge in order to engage the protruding spool end.

8 Claims, 5 Drawing Sheets

CAMERA EXTRACTS FILM CARTRIDGE RESPONSIVE TO OPENING DOOR

FIELD OF THE INVENTION

The invention relates generally to the field of photography, and in particular to cameras. More specifically, the invention relates to a camera provided with an extracting mechanism for pulling a film cartridge at least part way out of a chamber when a door to the chamber is opened.

BACKGROUND OF THE INVENTION

To facilitate unloading a film cartridge from a chamber in a camera, it has been suggested that an extracting mechanism be pivotally connected with a door to pull the film cartridge at least part way out of the chamber when the door is opened. See U.S. Pat. No. 5,506,650 issued Apr. 9, 1996 and No. 4,330,190 issued May 18, 1982. In these patents, the extracting mechanism is a hook-like arm that engages one edge of the cartridge shell to extract the film cartridge from the chamber when the door is opened. If, however, the camera is severely jolted, the hook-like arm might slip off the edge of the cartridge shell.

SUMMARY OF THE INVENTION

According to one aspect of the invention, a camera comprising a chamber for receiving a film cartridge, a door supported for closing movement to cover the chamber and for opening movement to uncover the chamber, and an extracting mechanism connected with the door for pulling the film cartridge at least part way out of the chamber when the door is opened, is characterized in that:

the extracting mechanism includes an engaging member adapted to engage a protruding spool end of the film cartridge, to permit the engaging member to tilt the film cartridge out of the chamber when the door is opened. More specifically, the engaging member has a partially enclosed catch-space configured to receive the protruding spool end of the film cartridge in order to engage the protruding spool end.

According to another aspect of the invention, a method of extracting a film cartridge from a chamber in a camera, comprises the steps of:

engaging a protruding spool end of the film cartridge; and pulling the engaged spool end to tilt the film cartridge out of the chamber when a door to the chamber is opened. More specifically, the protruding spool end is engaged by slipping an annulus over the protruding spool end to allow the protruding spool end to be received in a hole in the annulus when the door is closed.

DETAILED DESCRIPTION OF THE INVENTION

Figure 1:
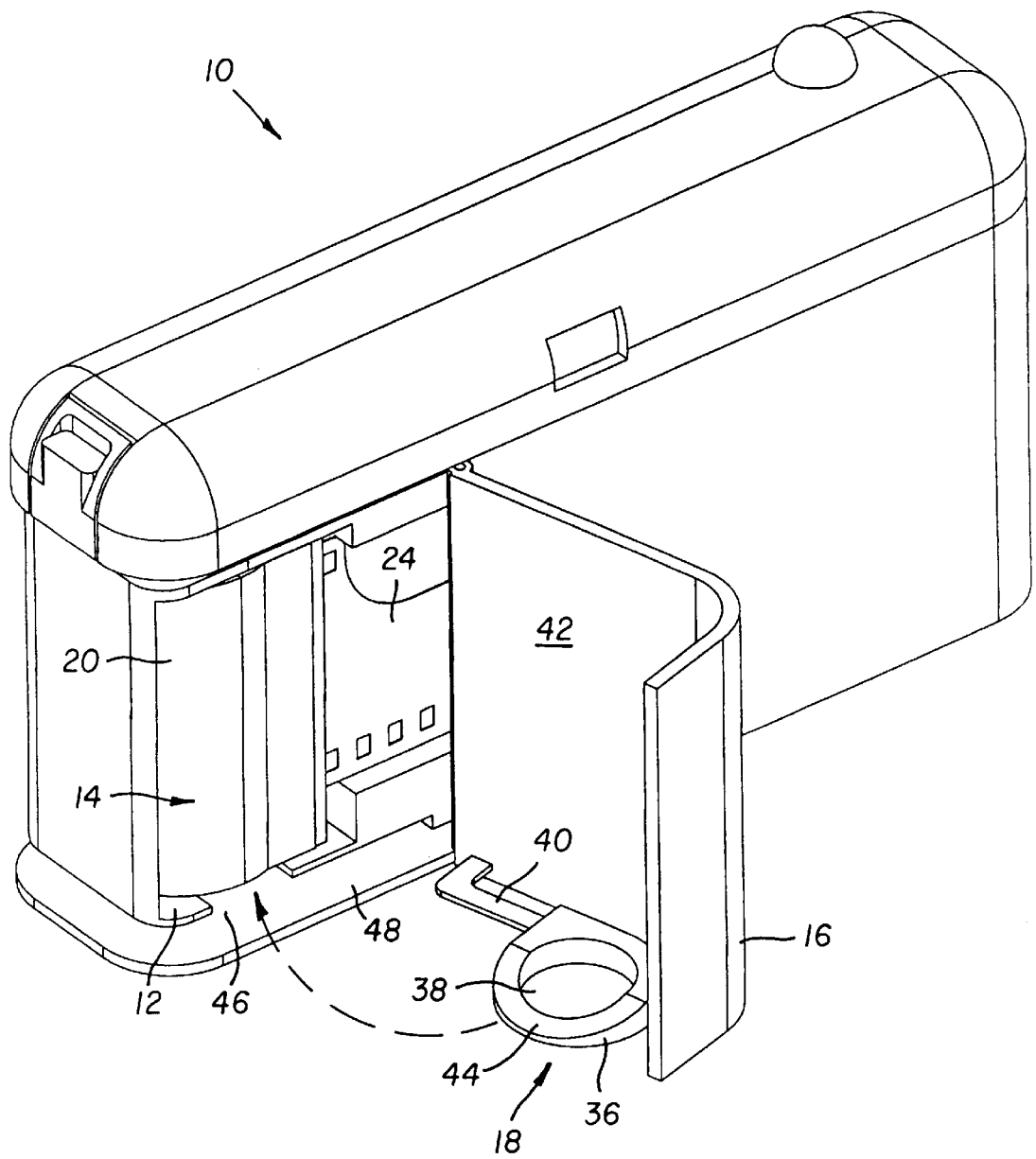
FIG. 1 is a rear perspective view of a camera that is a preferred embodiment of the invention, showing a rear door open preparatory to being closed in order for an engaging member connected with the door to engage a protruding spool end of a film cartridge in the camera.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a camera 10 comprising a chamber 12 for receiving a conventional 35 mm film cartridge 14, a rear door 16 pivotally supported for closing movement to cover the chamber and for opening movement to uncover the chamber, and an extracting mechanism 18 connected with the door for pulling the film cartridge at least part way out of the chamber when the door is pivoted open.

Figure 2:
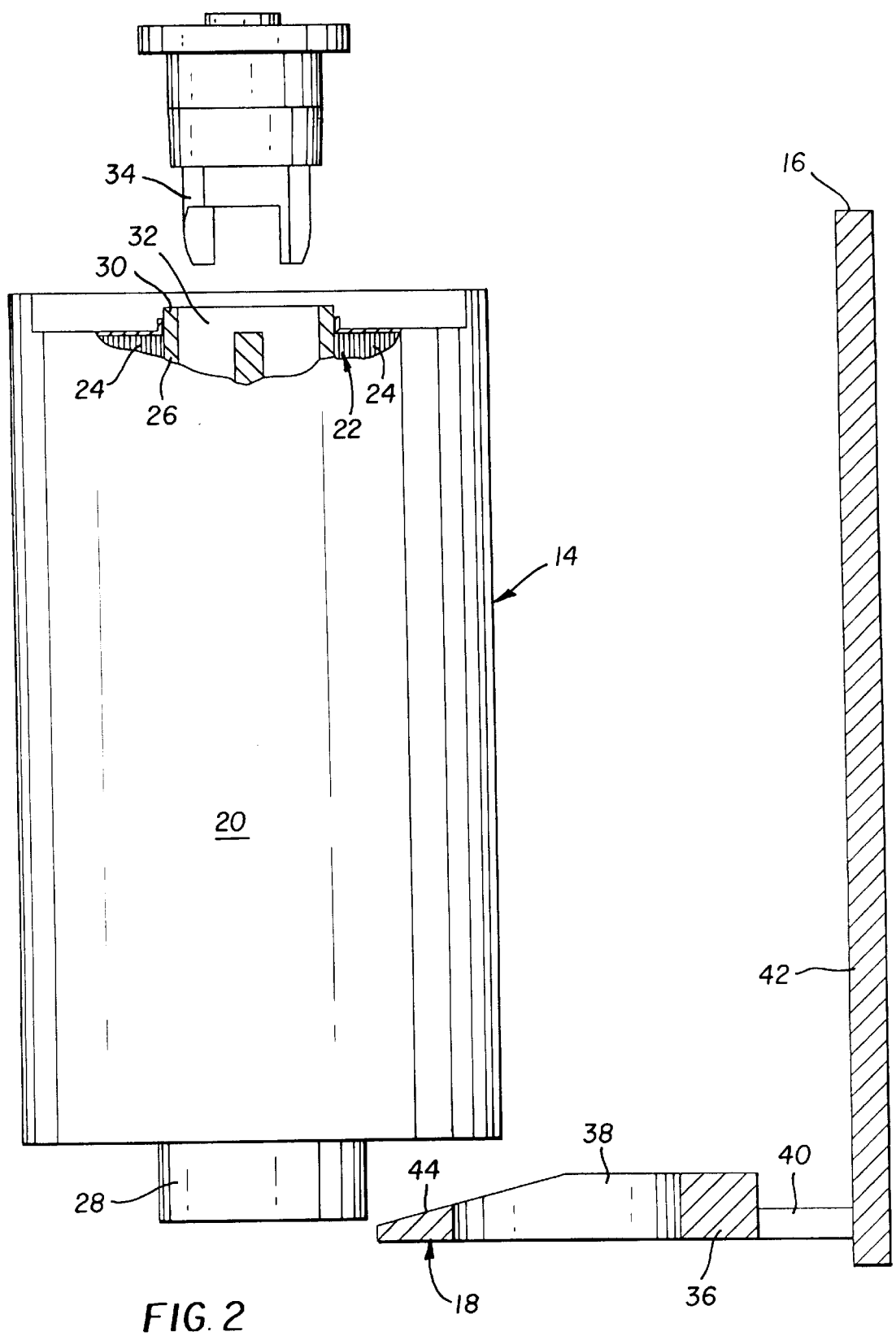
FIGS. 2, 3 and 4 are partial sectional views depicting how the engaging member engages the protruding spool end when the door is closed and how it tilts the film cartridge out of the camera when the door is opened.
Figure 3:
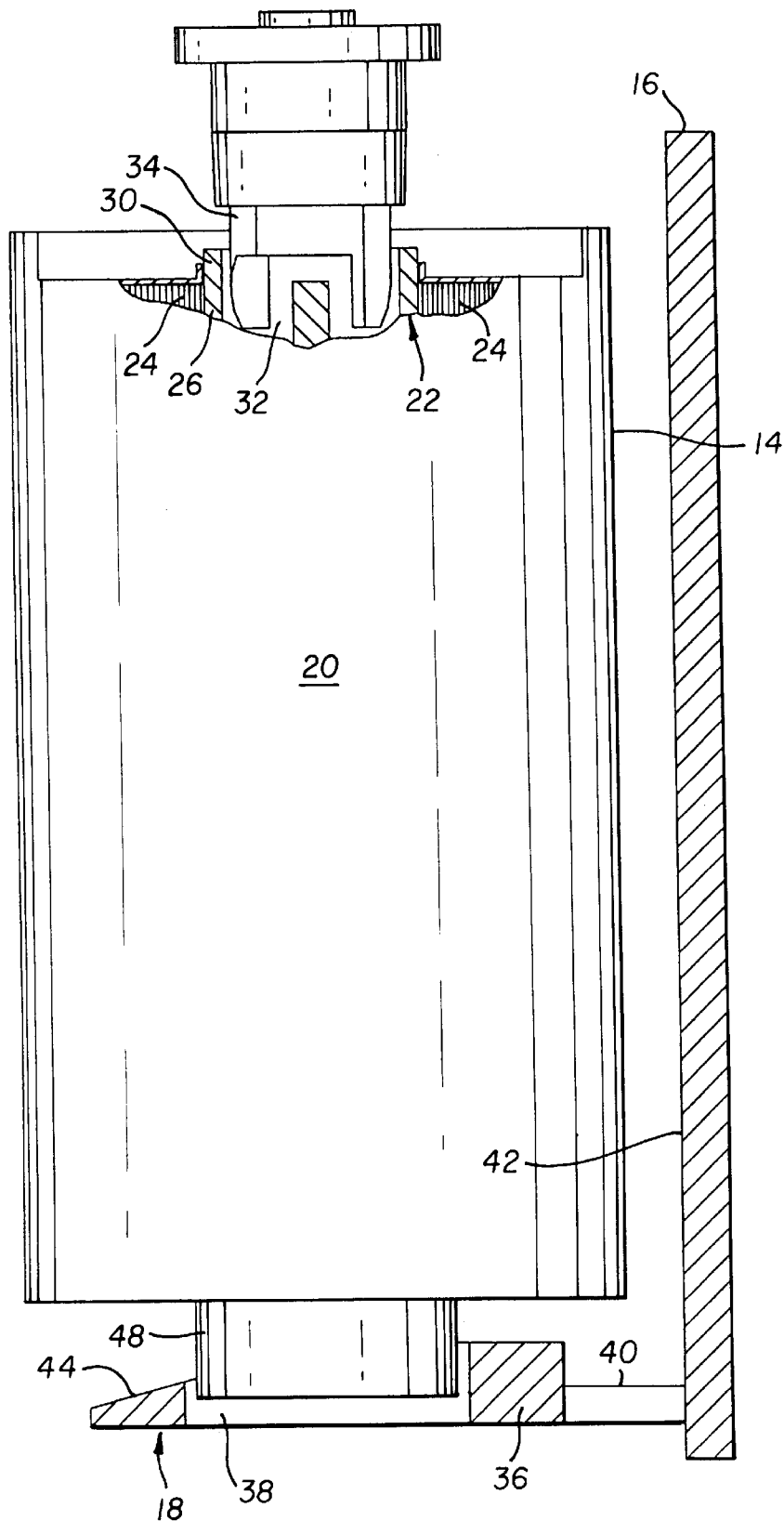
Figure 4:
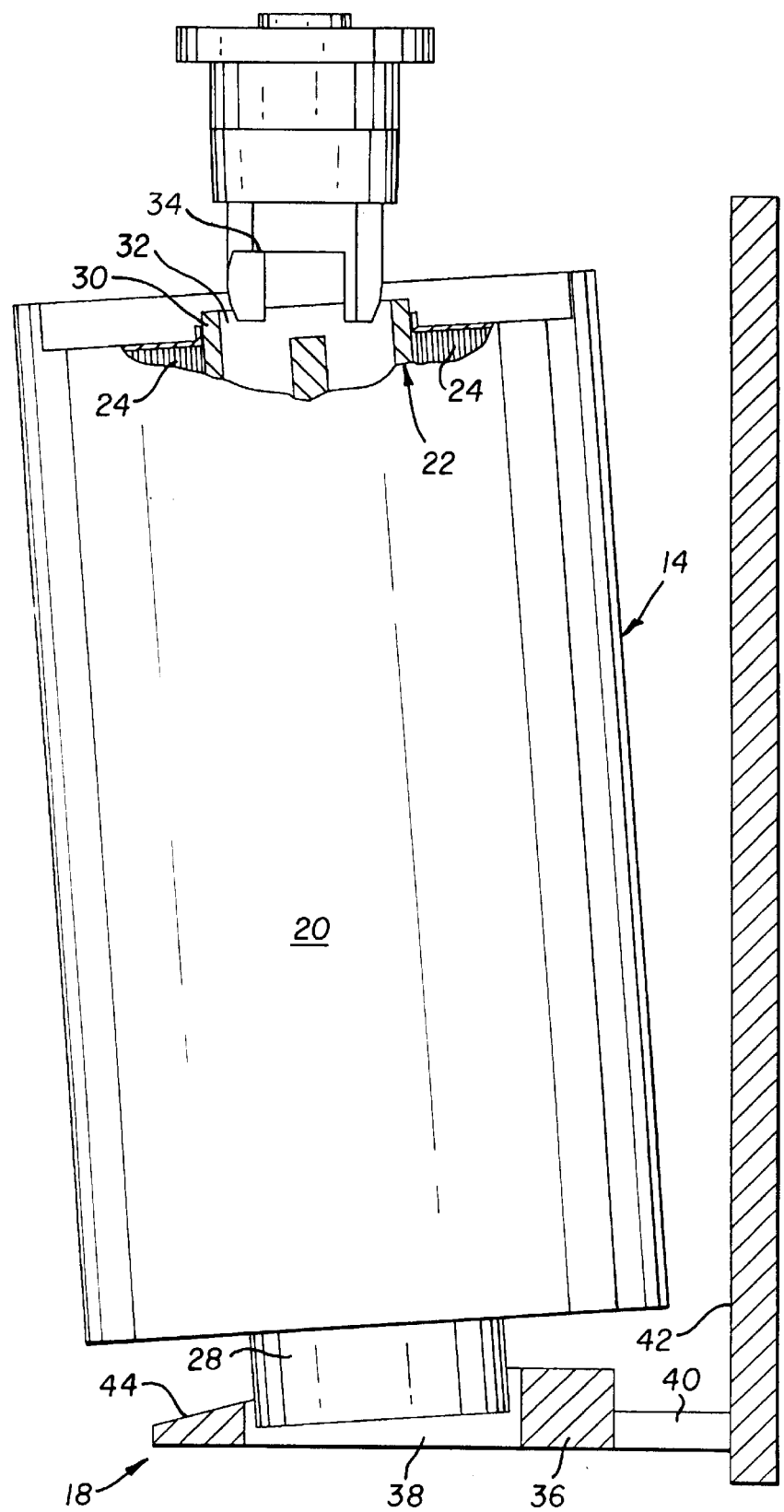

As shown in FIGS. 2–4, the film cartridge 14 includes a cartridge shell 20, a flanged film spool 22 rotatable inside the cartridge shell, and a 35 mm filmstrip 24 wound about a spool core 26 of the film spool. The spool core 26 has a protruding spool end 28 (i.e. protruding from one end of the cartridge shell 20 and a substantially-flush spool end 30 (i.e. substantially flush with another end of the cartridge shell). The substantially-flush spool end 30 has an open-end cavity 32 for receiving a known-type spindle 34 in the chamber 12, to rotatably support the film spool 22.

The extracting mechanism 18 consists of an engaging annulus 36 having a catch-hole 38, and a flexible support arm 40 that connects the engaging annulus with an interior side 42 of the door 16. The catch-hole 38 has a diameter that is greater than the diameter of the protruding spool end 28.

When the door 16 is pivoted closed as indicated in FIGS. 1–3, a ramped edge surface 44 of the engaging annulus 36 is inserted into a clearance space 46 beneath the chamber 12. The protruding spool end 28, at this time, hangs down into the clearance space 46. Consequently, the ramped edge surface 44 guides the protruding spool end 28 into the catch-hole 38, to slip the engaging annulus 36 over the protruding spool end, and elevates the film cartridge 14 for the spindle 34 to be received in the cavity 32 at the substantially-flush spool end 30. See FIG. 3. A rigid backer plate 48, beneath the clearance space 46, prevents the engaging annulus 36 from being shifted relative to the door 16 due to the flexibility of the flexible support arm 40.

Figure 5:
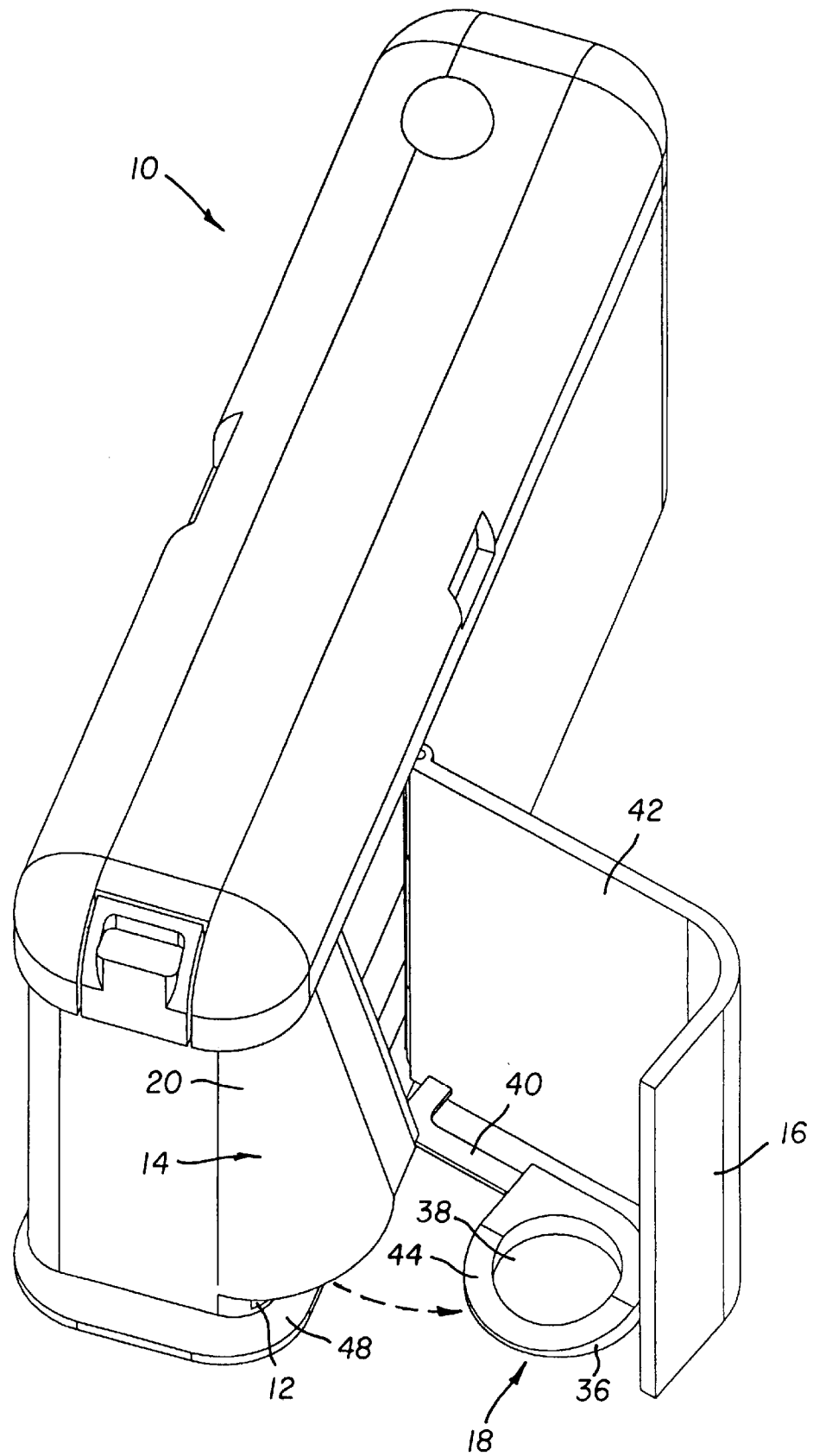
FIG. 5 is a rear perspective view similar to FIG. 1, showing the film cartridge tilted out of the camera.

When the door 16 is pivoted open as indicated in FIGS. 4 and 5, the engaging annulus 36 tilts the film cartridge 14 part way out of the chamber, 12, beginning at the protruding spool end 28. This causes the substantially-flush spool end 30 to be separated at the cavity 32 from the spindle 34. If the tilted cartridge 14 becomes lodged in the cavity 12 as shown in FIG. 5, further opening the door 16 allows the engaging annulus 36 to be shifted relative to the door by means of the flexible support arm 40 to disengage itself from the protruding spool end 28

The invention has been described with reference to a preferred embodiment. However, it will be appreciated that variations and modifications can be effected by a person of ordinary skill in the art without departing from the scope of the invention.

PARTS LIST 10. camera
12. chamber
14. film cartridge
16. rear door
18. extracting mechanism
20. cartridge shell
22. film spool 24. filmstrip
26. spool core
28. protruding spool end
30. substantially-flush spool end
32. cavity
34. spindle
36. engaging annulus
38. catch-hole
40. flexible support arm
42. interior side
44. ramped edge surface
46. clearance space
48. rigid backer plate

What is claimed is:

1. A camera comprising a chamber for receiving a film cartridge, a door supported for closing movement to cover said chamber and for opening movement to uncover the chamber, and an extracting mechanism connected with said door for pulling the film cartridge at least part way out of said chamber when the door is opened, is characterized in that:

said extracting mechanism includes an engaging member adapted to engage a protruding spool end of the film cartridge, to permit said engaging member to tilt the film cartridge out of said chamber when said door is opened.

2. A camera as recited in claim 1, wherein said engaging member has a partially enclosed catch-space configured to receive the protruding spool end of the film cartridge in order to engage the protruding spool end.

3. A camera as recited in claim 2, wherein said engaging member has a ramped edge surface leading to said catch-space for guiding the protruding spool end into the catch-space when said door is closed.

4. A camera as recited in claim 2, wherein a flexible member interconnects said engaging member and said door for allowing the engaging member to be shifted relative to the door in order to remove said catch-space from the protruding spool end of the film cartridge when the film cartridge is tilted out of said chamber.

5. A camera as recited in claim 4, wherein said engaging member has a ramped edge surface leading to said catch-space for guiding the protruding spool end into the catch-space when said door is closed, and a rigid backer prevents said engaging member from being swung relative to said door when said ramped edge surface guides the protruding spool end into said catch-space.

6. A camera comprising a chamber for receiving a film cartridge, a door supported for closing movement to cover said chamber and for opening movement to uncover the chamber, an extracting mechanism connected with said door for pulling the film cartridge at least part way out of said chamber when the door is opened, is characterized in that:

said extracting mechanism includes an engaging annulus having a hole configured to receive a protruding spool end of the film cartridge, to permit said engaging annulus to tilt the film cartridge out of said chamber, beginning at the protruding spool end, when said door is opened.

7. A method of extracting a film cartridge from a chamber in a camera, comprising the steps of:

engaging a protruding spool end of the film cartridge; and pulling the engaged spool end to tilt the film cartridge out of the chamber when a door to the chamber is opened.

8. A method as recited in claim 7, wherein the protruding spool end is engaged by slipping an annulus over the protruding spool end to allow the protruding spool end to be received in a hole in the annulus when the door is closed.

* * * * *